United States Patent [19]

Peng

[11] Patent Number: 5,555,125

[45] Date of Patent: Sep. 10, 1996

[54] OPTICAL SCANNER

[75] Inventor: Ke-Ou Peng, Delft, Netherlands

[73] Assignee: Opticon Sensors Europe B.V., Hoofddorp, Netherlands

[21] Appl. No.: 298,062

[22] Filed: Aug. 30, 1994

Related U.S. Application Data

[63] Continuation-in-part of Ser. No. 2,654, Jan. 11, 1993, Pat. No. 5,408,352.

[51] Int. Cl.⁶ .................................................. G02B 26/08
[52] U.S. Cl. ........................... 359/203; 359/201; 359/216; 359/198; 235/467; 250/236
[58] Field of Search ........................... 359/198–223, 359/226; 235/462, 467; 250/234–236

[56] References Cited

U.S. PATENT DOCUMENTS

| | | | |
|---|---|---|---|
| 4,870,274 | 9/1989 | Hebert et al. | 250/236 |
| 4,971,410 | 11/1990 | Wike, Jr. et al. | 235/472 |
| 5,151,812 | 9/1992 | Watson | 359/203 |
| 5,173,603 | 12/1992 | Lindacher | 250/236 |
| 5,384,453 | 1/1995 | Peng | 235/467 |
| 5,434,696 | 7/1995 | Watson | 359/203 |

*Primary Examiner*—James Phan
*Attorney, Agent, or Firm*—Parmelee, Bollinger & Bramblett

[57] ABSTRACT

Optical scanner having a laser source for generating a laser beam, a first deflector for deflecting the laser beam towards an array of reflectors, the first deflector and the array of reflectors being rotatable relative to each other about a first axis, drive means for providing a rotation, and at least one detector for detecting backscattered light, said first deflector and said array of reflectors being arranged to deflect said laser beam in a direction substantially parallel to the first axis.

7 Claims, 7 Drawing Sheets

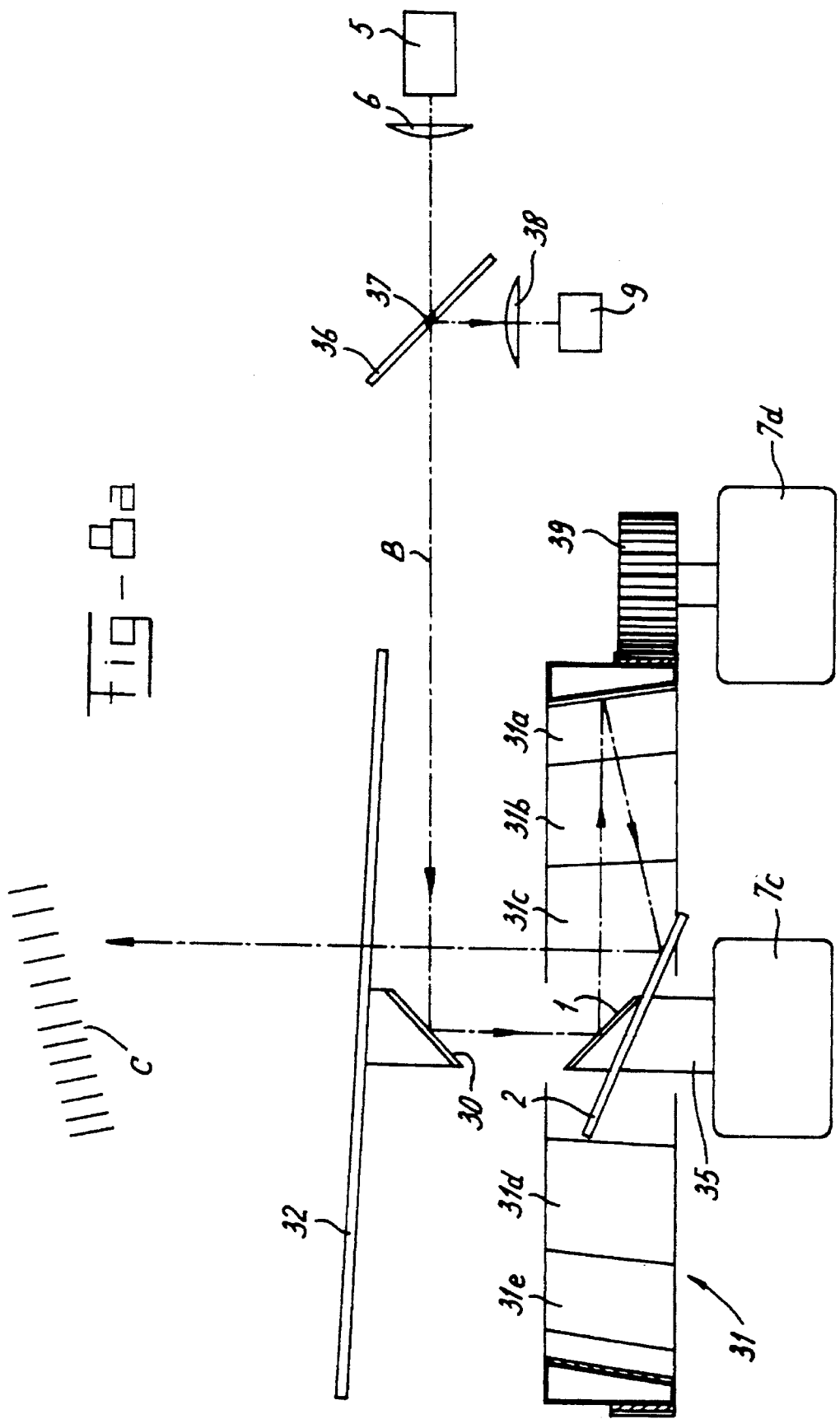

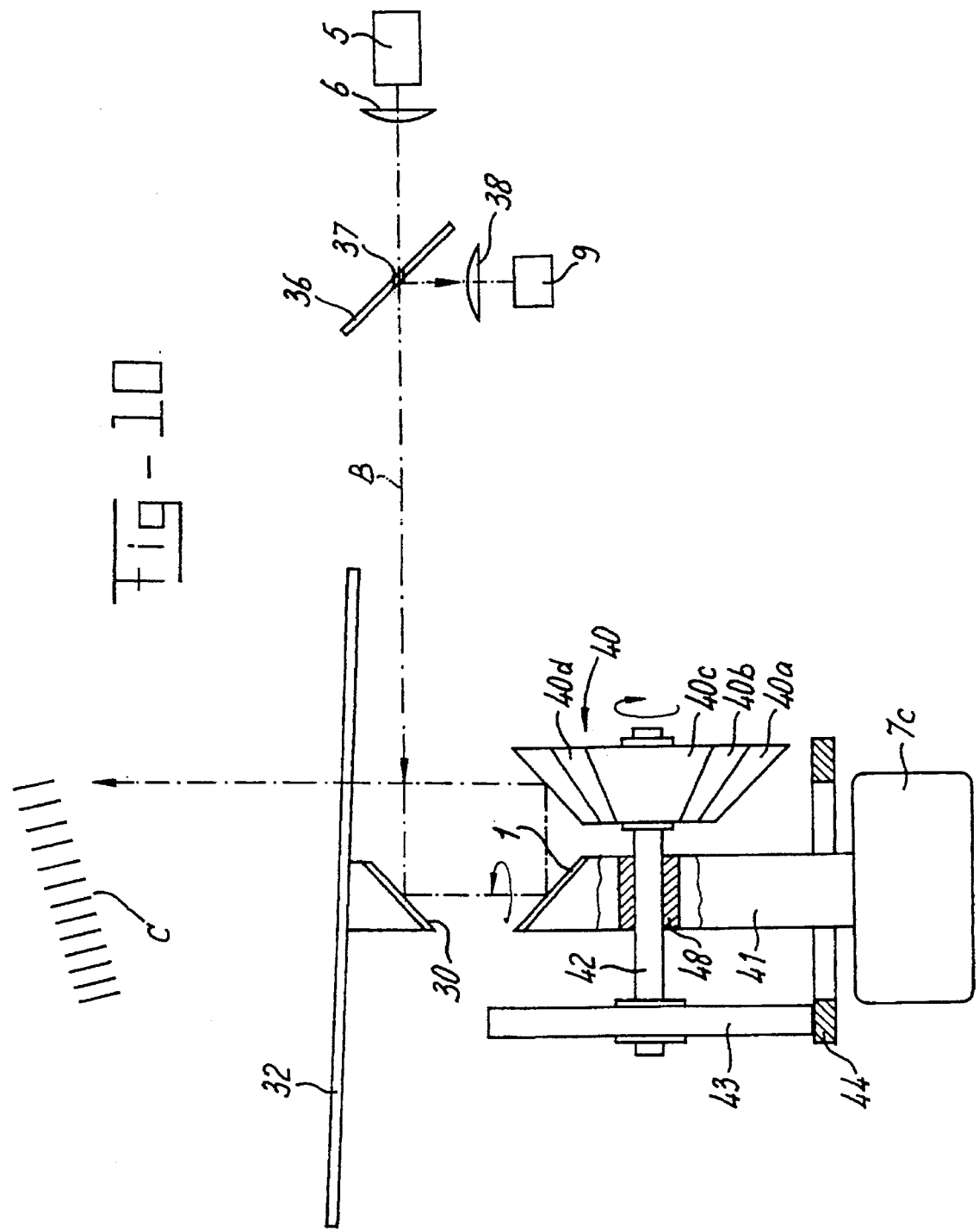

OPTICAL SCANNER

This application is a continuation-in-part of application Ser. No. 08/002,654, filed by the present inventor on Jan. 11, 1993, now U.S. Pat. No. 5,408,352.

BACKGROUND OF THE INVENTION

The invention relates to an optical scanner, more particularly an optical scanner suitable for scanning bar codes, comprising a laser source for generating a laser beam, a first deflector for deflecting the laser beam towards an array of reflectors, the first deflector and the array of reflectors being rotatable relative to each other about a first axis, drive means for providing a rotation, and at least one detector for detecting backscattered light. Such an optical scanner is known from U.S. Pat. No. 4,699,447.

In the known optical scanner the array of reflectors is constituted by a basket-shaped array of mirrors. A centrally positioned rotatable mirror deflects the beam generated by a laser source towards the mirrors of the basket-shaped array, the laser beam sweeping across the mirrors so as to generate scanning lines. From each mirror of the array the laser beam is subsequently directed towards the bar code to be scanned. As the scanner during operation is usually pointing at the bar code to be scanned, this bar code will be located on or near the axis of the scanner, this axis in the known scanner being the rotational axis of the centrally positioned rotatable mirror. Since the mirrors of the array are necessarily located off-axis, the laser beam reflected by the mirrors of the array will be slanted relative to the axis of the scanner so as to be directed towards the axis and thus towards the bar code located on this axis. Due to this slant of the reflected beam, however, there will be only a limited region in which the reflected beam is located near the axis and thus on the bar code. This region, which constitutes the effective scanning region, will be located at the intersection of the reflected beam and the axis. At a point nearer to or further away from the scanner and thus removed from this intersection, the reflected beam will not be able to scan the bar code since it will not cross all the bars of the code. The effective scanning range of this known scanner is therefore limited to the region where the reflected laser beam intersects the axis, since the laser beam will not be able to (completely) scan a bar code outside this region. Placing the bar code off-axis is not a solution, since in that case the light reflected by one or two mirrors may impinge upon the code, but the light reflected by the mirrors opposite those one or two mirrors will miss the bar code altogether, resulting in an incomplete scanning pattern and a decreased chance of reading the code correctly. This problem is aggravated by the fact that in the typical scanning pattern the most effective region for reading a bar code is around the centre of the pattern. Preferably, the scanner should be able to provide a scanning pattern of which at least the central region is independent or virtually independent of the scanning distance, i.e. independent of the distance of the bar code from the scanner.

In U.S. Pat. No. 5,177,347 a bar code reading apparatus is described in which, a laser beam generated by a laser source is directed to a first mirror through a hollow shaft of a motor The first mirror directs the laser beam to a mirror array. The mirror array reflects the laser beam to a second rotation mirror which directs the laser beam in a direction substantially along the path of propagation of the laser beam when impinging upon the first mirror. By this known arrangement the problems mentioned above are largely overcome. However, the use of a motor having a hollow drive shaft is rather expensive.

SUMMARY OF THE INVENTION

The object of the present invention is to provide optical scanners in which the problems as present in the optical scanner of U.S. Pat. No. 4,699,447 are avoided, i.e. to provide scanners capable of producing scanning patterns which are substantially independent of the scanning distance.

A further object of the present invention is to provide such optical scanners in which no motors having hollow driving shafts are needed.

According to the invention, an optical scanner having an improved scanning range is characterized in that the scanner further comprises a second deflector rotatable about a second axis for deflecting the beam reflected by the array of reflectors in a direction substantially parallel or coincident with the second axis.

As the second deflector according to the invention redirects the laser beam to the second axis, thus making the laser beam emanating from the scanner parallel or coincident with this axis, the laser beam of the scanner will impinge upon a bar code located on or near the axis, irrespective of the distance of the code from the scanner. Since the reflected beam is not slanted, the effective scanning region is not limited to an area near the intersection of the beam and the axis as in the scanner known from U.S. Pat. No. 4,699,447. In fact, in the scanner according to the invention the reflected beam will in most instances at least in one point of each scanning line be substantially coincident with the axis, thus ensuring an optimal scanning capability.

The scanning axis of the optical scanner on or near which the bar code to be scanned must be located is constituted by the second axis, as the second axis is the axis the laser beam emanating from the scanner is parallel or coincident with. According to a first embodiment of the invention, the first axis and the second axis coincide. That is, the first deflector and the array of reflectors rotate relative to each other about the same axis as the second deflector. This is however not necessary, as will be demonstrated in a second embodiment of the invention, in which the first axis and the second axis are parallel.

It will be understood that the above-mentioned first and second axes are geometrical rather than mechanical axes, and that in an actual embodiment of the scanner the two axes may, although geometrically coincident, be mechanically distinct. This may especially be the case when, according to a preferred embodiment, the drive means are arranged for providing a stepped rotation of the second deflector. With such a stepped rotation, the curvature of the scanning lines across the bar code can be virtually eliminated by halting the movement of the second deflector during the scanning of each reflector and rapidly moving the second deflector to its next position, preferably opposite the next reflector of the array, just before the scanning of the next mirror. If the first and second axes geometrically coincide in such an arrangement, the mechanical axis is advantageously constituted by a double axis, one axis being hollow so as to accomodate the other axis, thus enabling for example a continuous rotation of the first deflector and a discontinuous rotation of the second deflector. The drive means should in that case of course be adapted for providing these two different rotational movements.

In one embodiment the drive means comprises an electric motor having a hollow shaft. This allows the laser beam emanating from the laser source to pass through the shaft, thus being substantially coincident with the first and/or, if necessary, the second axis. This arrangement provides an advantageous angle of incidence of the laser beam upon the first deflector. In order to provide a more flexible positioning of the laser source relative to the deflectors and the drive means, the scanner according to the invention may further comprise a third deflector for directing the laser beam emanating from the laser source towards the first deflector. Such a third deflector can e.g. be used for directing the laser beam through the hollow shaft of the drive means.

The first, second and/or third deflector can be constituted by a mirror, a prism, or a holographic deflector.

The array of reflectors produces a scanning pattern, the number of scanning lines of the pattern being dependant on the number of reflectors. As in most cases a star-shaped scanning pattern (asterisk) is desired, the scanning lines produced by the reflectors are rotated relative to each other. Since two coincident scanning lines are superfluous, an odd number of scanning lines provides an optimal scanning efficiency. Consequently, the optical scanner according to the invention is preferably arranged in such a way that the array of reflectors comprises an odd number of reflectors.

In a first embodiment of the optical scanner according to the invention, the array of reflectors is constituted by a substantially ring-shaped arrangement of mirrors, the first and second deflector being arranged coaxially relative to the ring. That is, the first and second deflectors are preferably located in or near the centre of the ring. It will be understood that the substantially ring-shaped arrangement also comprises other approximately annular arrangements, such as polygonal arrangements of mirrors, the reflective sides of the mirrors substantially facing the centre of the arrangement. The mirrors may be positioned orthogonally with respect of the plane defined by the ring, but may also be tilted with respect to this plane. The particular tilting angle of the mirrors is required to produce a space-invariant scanning pattern. This angle will depend on the relative locations and tilting angles of the first and second deflectors. Preferably, the ring of mirrors is stationary while the first and second deflectors rotate. It is however possible to keep the first deflector stationary while rotating the array of mirrors. This may result in a scanning pattern consisting of a single line or, if the mirrors of the array have mutually different tilting angles, in a pattern consisting of parallel lines. It is also possible to rotate both the array of mirrors and the first deflector, if necessary in opposite directions. The second deflector, which is rotated generate a star-shaped scanning pattern but could be stationary if a linear scanning pattern were desired, can rotate together with the first deflector, in which case both reflectors could be mounted in a common unit, or can rotate independently, e.g. for carrying out a stepped rotation.

Although this first embodiment of the scanner according to the invention provide a good scanning capability, the scanning lines generated with the aid of an array of (tilted) mirrors will only be straight if the first and second deflectors rotate independently. This necessitates the use of two motors or of a relatively complicated gear system, thus increasing the costs of the scanner. For some applications, however, substantially straight scanning lines are desired. In the optical scanner according to the invention the curvature of the scanning lines can be minimized, even if only one motor is used, by a proper choice of the geometry of the components, i.e. of the angles and relative positions of the first and second mirrors in conjunction with the angles of the mirrors in the array. Alternatively, additional optical components can be used to minimize the curvature.

A further embodiment of the invention provides for an optical scanner comprising a laser source for generating a laser beam, at least one detector for detecting light scattered back from an object to be scanned, a first deflector for reflecting said laser beam towards a rotatable array of reflectors, a second deflector being rotatable together with said first deflector about a first axis of rotation for reflecting said laser beam reflected by said array of reflectors in a direction substantially parallel with said first axis of rotation. It is observed that, here, "parallel" is meant to include both coinciding with and being remote from said axis of rotation.

In such an embodiment the array may be made of a polygon having external reflective faces, which polygon is arranged on an arm, which arm is rotatable about the first axis and which polygon is rotatable relative to the arm about a second axis, the first and second reflectors being fixed on the arm. In such embodiment the curvature of the scanning lines produced may be minimized or eliminated. The outer faces of the polygon can be parallel or approximately parallel to their rotation axis (second axis), thereby supporting the generation of substantially straight scanning lines. A scanning pattern comprising substantially parallel scanning lines can be obtained if the reflective faces of the polygon have mutually different tilting angles.

Preferably, the polygon is arranged on an arm, the arm being rotatable about the first axis and the polygon being rotatable relative to the arm about the second axis, the first deflector and the second deflector being non-rotatably fixed on the arm. With such an arrangement, the curvature of the scanning lines is reduced when the speed of rotation of the polygon is increased and the speed of rotation of the arm is decreased.

The polygon can be rotated relative to the arm by a separate motor. A simpler and more cost-effective structure is obtained when the polygon is rotated by a wheel connected to the polygon, the wheel being in contact with a race. As an alternative, the polygon is rotated by a belt driven by the drive means.

The first deflector and the second deflector can be constituted by mirrors or a prism. If a further deflector, consisting of two mirrors or a prism, is used to direct the laser beam emanating from the first deflector towards the polygon, the first and second deflector can advantageously be constituted by the same element. That is, the first deflector and the second deflector are constituted by a two-sided mirror.

In an alternative embodiment, the array of reflectors is made of a polygon having internal reflective faces, which polygon is also rotatable about the first axis of rotation, the scanner further comprising a third stationary deflector for directing said laser beam originating from said laser source towards said first deflector substantially along said first axis of rotation, and wherein said second deflector, during operation, reflects said laser beam parallel to but spaced from said first axis. In such an alternative embodiment, the use of a motor having a hollow drive shaft is avoided, thus substantially reducing the costs of the scanner. In this case, a conventional and cheaper motor having a solid shaft can be used. With this conventional motor, the scanning beam must be incident on the first deflector, mounted on the rotation shaft, from the opposite direction.

A further reduction of the costs is achieved in a still further embodiment in which an optical scanner is provided, comprising a laser source for generating a laser beam, at least one detector for detecting light scattered back from an object to be scanned, a first deflector for reflecting said laser beam towards an array of reflectors, a second deflector being rotatable together with said first deflector about a first axis of rotation for reflecting said laser beam reflected by said array of reflectors in a direction substantially parallel with said first axis of rotation, wherein said array of reflectors is made of a polygon having internal reflective faces, the scanner further comprising a third stationary deflector for directing said laser beam originating from said laser source towards said first deflector substantially along said first axis of rotation, and wherein said second deflector, during operation, reflects said laser beam to the bar code. For the space-invariant pattern, the beam being close to the first axis, is parallel to but spaced from this first axis. In such an embodiment the polygon is fixed thus avoiding all costs related to the second motor and the rotatability of the polygon.

An other embodiment provided with a conventional motor comprises a laser source for generating a laser beam, a first deflector for reflecting said laser beam towards an external rotating polygon. The first deflector is driven by said conventional motor in order to rotate about a first axis of rotation. The polygon and a shaft to which it is mounted is able to rotate about a second axis of rotation perpendicular to the first axis of rotation. The first deflector and the facets of the polygon are most preferred to be tilted 45° relative to both the first and the second axis of rotation. To rotate the polygon about the second axis of rotation a special driving means, such as a wheel-race unit, may be used. The wheel is fixed to the rotation shaft of the polygon in such a way that it can rotate together with the polygon. When the wheel is running around the race, centered at the first axis, the wheel, and therefore the polygon, is rotating about the second axis of rotation. Of course, instead of a wheel-race unit other driving means, such as gears, may also be used.

The laser beam incident upon the first deflector is deflected to the reflective faces of the polygon rotating around the second axis with different speed. Since the reflective faces of the polygon are tilted substantially 45° relative to both the first axis of rotation and the second axis of rotation the laser beam, after being reflected by the reflective faces, will be projected back to the direction opposite to the direction of incident upon the first deflector. Because of the distance between the points of incidents of the laser beam on the first deflector and the faces of the polygon the scanning line will be shifted from the axis of rotation.

A third deflector may be arranged to direct the beam originating from the laser source to the first deflector without introducing interference between the laser beam incident upon the first deflector and the laser beam leaving the scanning apparatus.

In general, a multi-directional scanning pattern is preferably produced, comprising a plurality of scanning lines around the axis of rotation of the second deflector. Such a pattern, which is typically symmetrical or nearly symmetrical, allows the effective scanning of e.g. bar codes in a plurality of directions.

BRIEF DESCRIPTION OF THE DRAWINGS

The invention will further be explained under reference to the accompanying drawings.

FIG. 8a and 8b schematically show further embodiments of an optical scanner according to the invention in partial cross-section.

FIG. 9 shows an example of a scanning pattern generated by the arrangement according to FIG. 8a.

FIG. 10 schematically shows a further embodiment of an optical scanner according to the invention in partial cross-section.

DETAILED DESCRIPTION OF THE EMBODIMENT

Figure 1:
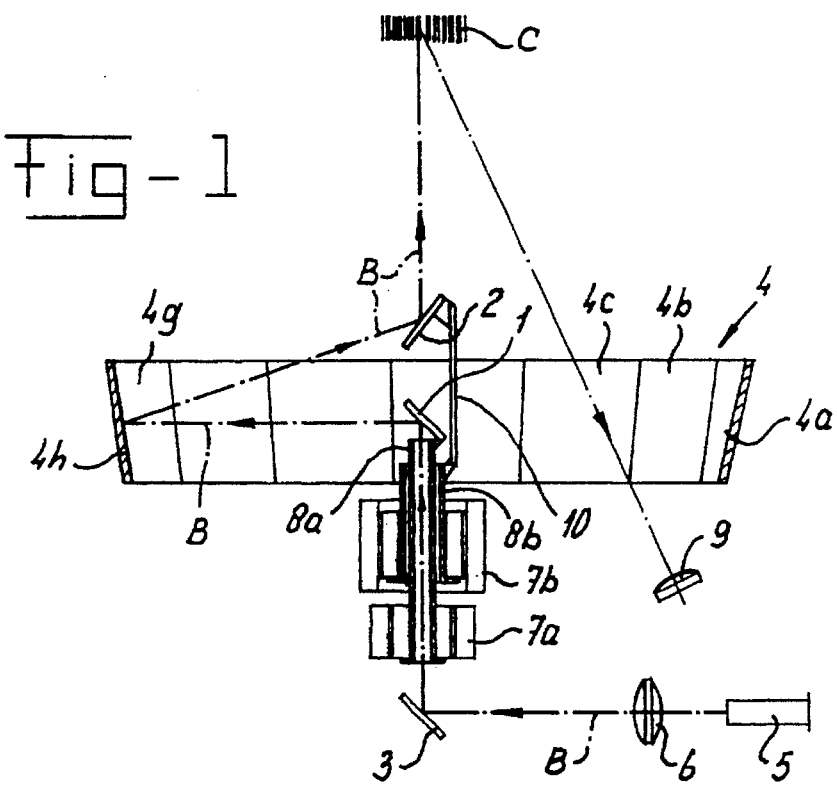
FIG. 1 shows a first embodiment of the optical scanner according to the invention in partial cross-section.

In FIG. 1 an optical scanner is depicted in partial cross-section. The scanner comprises a first deflector 1, a second deflector 2, a third deflector 3, an array 4 of mirrors (4a–4o), a laser source 5, focussing optics 6, a drive means 7 having a shaft 8, as well as at least one detector 9.

The laser source 5, which may be a commercially available diode laser, generates a, laser beam B which is focussed by the focussing optics 6, which can comprise a single lens or a set of lenses. The third deflector 3, which is in the illustrated embodiment constituted by a mirror, directs the laser beam through the hollow shaft 8 of the drive means 7. It will be understood that the third deflector 3 can be omitted when the laser source 5 is arranged in such a way that the laser beam B is aimed directly at the first deflector 1. The first deflector 1, which is illustrated as being a mirror, deflects the laser beam B towards one of the mirrors 4a–4o of the array. From the array 4 of mirrors the beam is deflected towards the second deflector 2, which directs the laser beam B towards the a bar code C. As can be seen from FIG. 1, the part of the laser beam B deflected by the second deflector 2 is in line with the part of the laser beam B passing through the hollow shaft 8, and coincides with the axis of rotation of the shaft 8.

In the embodiment illustrated in FIG. 1, the rotational axes of the deflectors (i.c. mirrors) 1 and 2 coincide. The rotation of the first deflector 1 is provided by first drive means 7a via a first hollow shaft 8a, while the rotation of the second deflector 2 is provided by second drive means 7b via a second hollow shaft 8b and a rod 10 mounted on the shaft 8b, the shafts 8a and 8b being coaxial. The drive means 7a and 7b are preferably constituted by electric motors, which may be commercially available. This arrangement comprising two separate drive means 7a and 7b and two separate shafts 8a and 8b allows an independent movement of the deflectors 1 and 2. The drive means 7a could for example be arranged for providing a continuous rotation of the first mirror 1 while the drive means 7b could be constituted by a stepping motor for providing a stepwise rotation of the second deflector 2. In case the deflectors 1 and 2 are to perform identical rotations, the drive means 7a and 7b can be replaced by a single drive means 7, and the shafts 8a and 8b can be combined into a single shaft 8.

Figure 2:
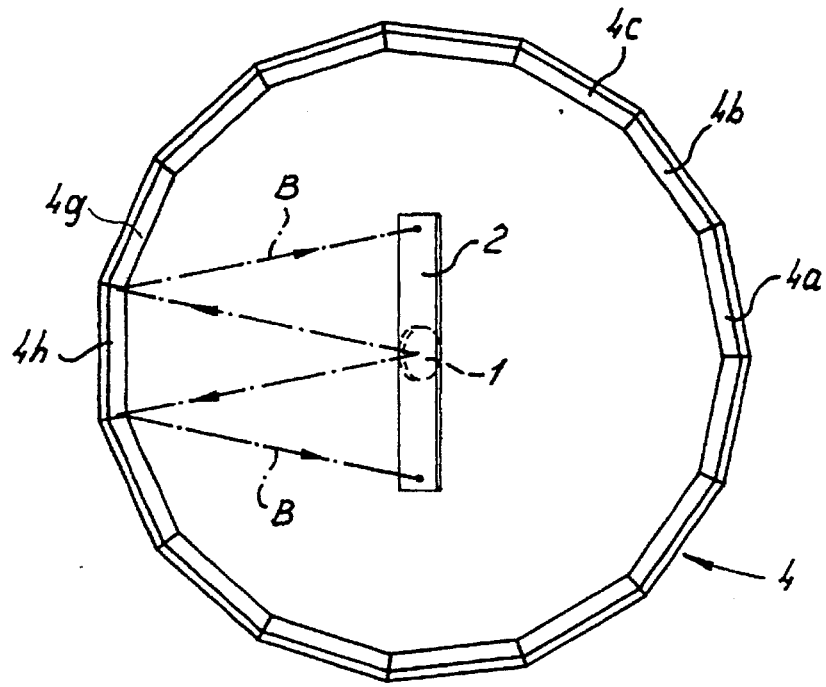
FIG. 2 shows the optical scanner of FIG. 1 in top view.

As is shown in FIG. 2, the array of mirrors is approximately ring-shaped. The embodiment shown comprises an odd number, i.c. 15, mirrors 4a–4o, thus constituting a polygon having internal reflective sides.

As can be seen from FIGS. 1 and 2, the mirrors of the array 4 are tilted relative to the rotational axis, i.e. relative to the shafts 8a and 8b. Also, the first deflector 1 is arranged so as deflect the laser beam B over an angle of approximately 90°. If the relative positions and the tilting angles of at least one of the deflectors 1 and 2 are changed, the tilting angles of the mirrors of the array 4 may also be changed, e.g. so as to be parallel with the rotational axis. Proper combinations of positions and tilting angles resulting in a minimized curvature of the scanning lines produced by the inventive scanner may also be achieved. Additional optics may be used to minimize this curvature and to produce a scanning pattern which is substantially identical in all scanning planes along the axis irrespective of heir distance from the scanner. The scanning and reading of e.g. a bar code can therefore effectively be realized a various distances and in various orientations.

The deflectors 1 and 2 are centrally located with respect to the approximately ring-shaped array 4. The second deflector 2 has a width which is sufficient to deflect the entire scanning line produced by a mirror, e.g. mirror 4h. That is, the laser beam B reflected by the peripheral areas of the mirror 4h should also be deflected by the deflector 2, as is schematically illustrated in FIG. 2. It will be understood that the beam deflected by substantially the centre of the deflector 2 will be substantially parallel or coincident with the axis of rotation, as shown in FIG. 1. The first deflector 1 may have much smaller dimensions, as it typically deflects a laser beam issuing from a single point.

The light backscattered by e.g. a bar code C is detected by the detector 9, provided with suitable optics, which may be connected with suitable decoding means (not shown).

Instead of an array of mirrors, another scanning pattern generator can be used, such as a disc comprising holographic elements. Such a disc could be Positioned in a plane Perpendicular to the first axis. Alternatively, holographic deflectors could be used instead of the mirrors shown in FIGS. 1 and 2.

Figure 3:
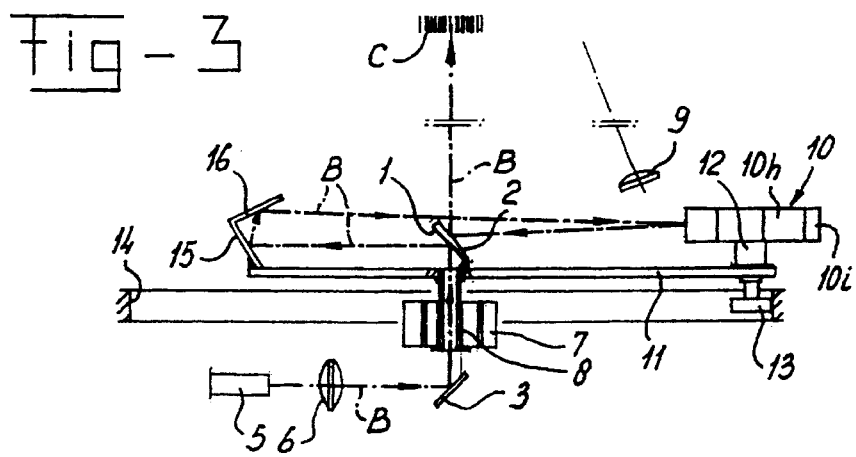
FIG. 3 shows a second embodiment of the optical scanner according to the invention in partial cross-section.

The embodiment shown in FIG. 3 also comprises a first deflector 1 and second deflector 2, these deflectors being combined into one double-sided mirror. The scanner further comprises a third deflector 3 and a polygon 10, the reflective sides 10a–10i of which are equivalent in function to the mirrors 4a–4o of the mirror array 4 of FIG. 1. It will be understood that the third deflector 3 can be omitted when the laser source is arranged in such a way that the laser beam B is aimed directly at the first deflector 1. The embodiment of FIG. 3 also comprises a laser source 5, focussing optics 6, a drive means 7 with a hollow shaft 8, as well as a detector 9 with suitable optics. The Polygon 10 is mounted on an arm 11, which is rotatable around an axis constituted by the shaft 8. In order to rotate the polygon 10 relative to the arm 11, the polygon 10 is via a rotatable axis 12 connected with a wheel 13, which during operation is in rolling contact with a race 14. As the arm 11 is rotated by the drive means 7, the wheel 13 rolls along the race 14 thus rotating the axis 12 and the polygon 10 relative to the arm 11. It is, however, also possible to rotate the polygon 10 by other means, e.g. by a second drive means or by gears and a drive shaft (not shown). It will be understood that in the embodiment of FIG. 3 the axis 12 constitutes the first axis, while the shaft 8 constitutes the second axis.

In the embodiment shown in FIG. 3, the lower side 1 of the two-sided mirror deflects the laser beam B emanating from the hollow shaft 8 in such a way, that the deflected beam B is substantially perpendicular to the axis of rotation provided by the shaft 8. The beam is further deflected by mirrors 15 and 16, mounted on the arm 11, in the direction of the rotating polygon 10. The angle of incidence of the laser beam B upon the reflective faces 10a–10i is preferably approximately 90°. The beam reflected by the polygon 10 sweeps across the upper side 2 of the two-sided mirror, producing a scanning line. The beam B and thus the scanning line is projected by the rotating deflector 2 onto e.g. a bar code C. As the deflector 2 is located on the rotational axis of the scanner, the scanning lines, which are rotated relative to each other, will also be substantially located on the axis. Light backscattered from the code C will be detected by the detector 9, which is provided with suitable optics, such as a lens, for focussing the backscattered light.

Figure 4:
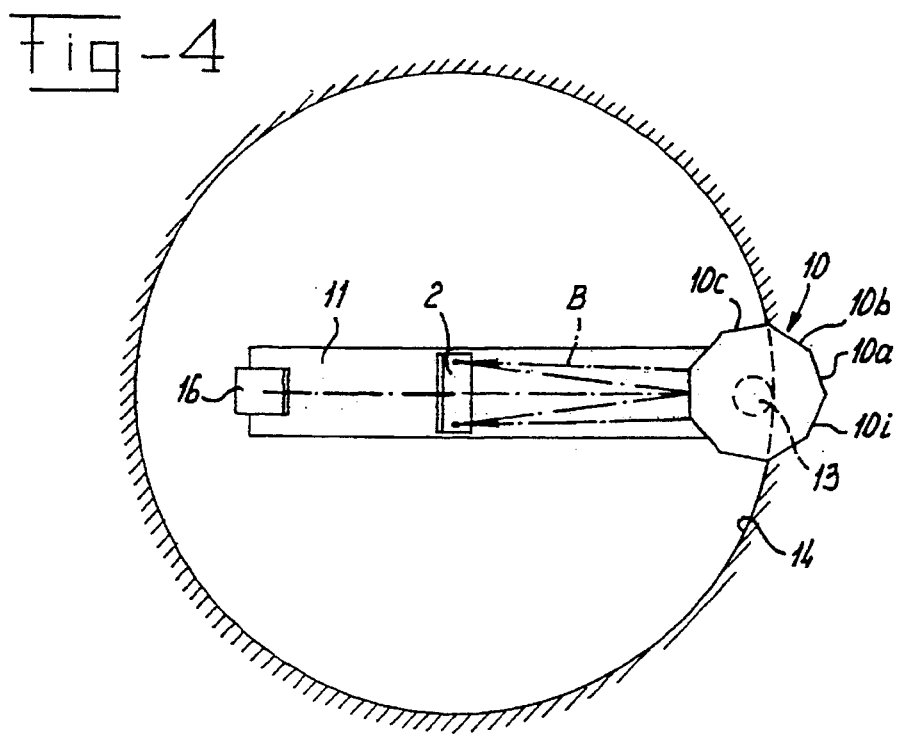
FIG. 4 shows the optical scanner of FIG. 3 in top view.

The top view of FIG. 4 clearly shows the structure of this embodiment of the inventive scanner, comprising the race 14 and the arm 11 on which the mirrors 15 and 16 and the polygon 10 are mounted.

Figure 5:
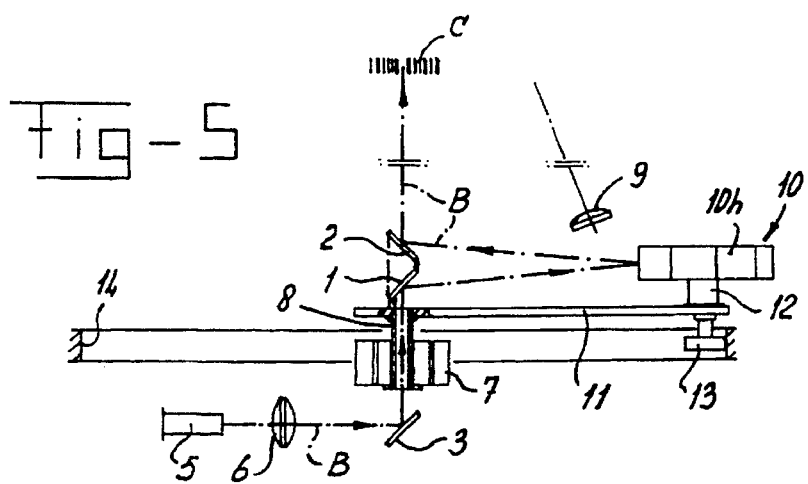
FIG. 5 shows a modified version of the scanner of FIG. 3 in partial cross-section.

The embodiment of FIG. 5 differs from that of FIG. 3 in that the deflectors 1 and 2 are not constituted by a two-sided mirror or mounted back-to-back, but are mounted adjacent to each other, the first deflector 1 being fixed on the arm 11. The deflectors 1 and 2 may be substituted by the reflective faces of a single structure, e.g. a prism.

The relative dimensions of the components of the scanner shown in FIG. 5 may also be chosen so as to make the laser beam B approximately perpendicular to the faces 10a–10i on which it is incident.

The faces 10a–10i are shown to be parallel with their axis of rotation, i.e. the axis 12. For some applications it may, however, be advantageous to employ a polygon 10 having tilted faces 10a–10i.

Figure 6:
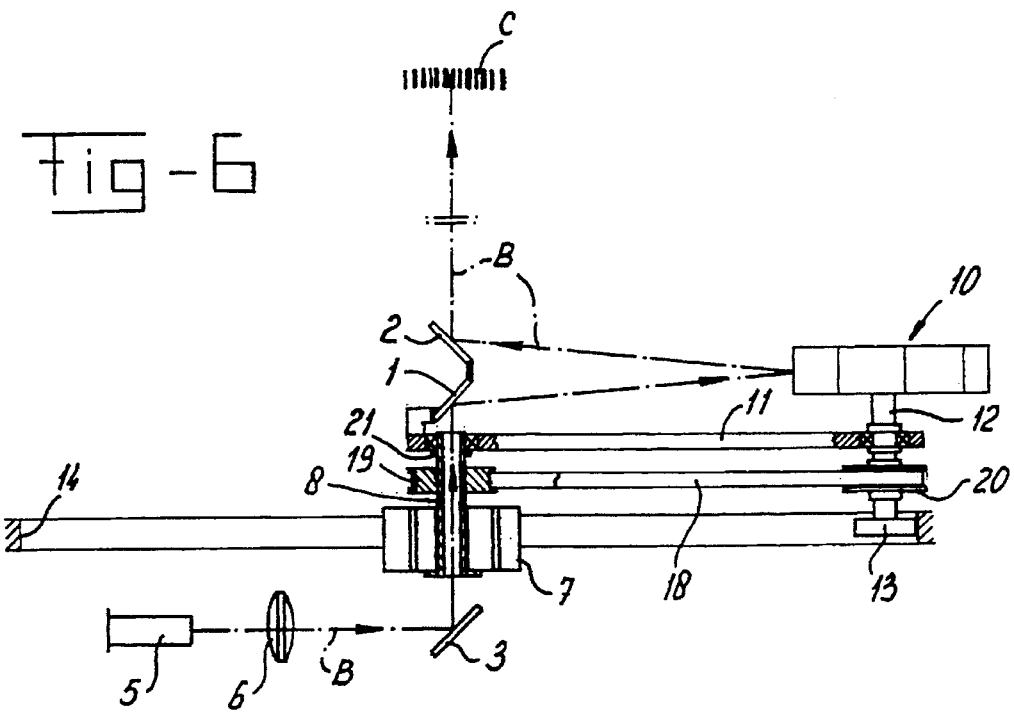
FIG. 6 shows an alternative version of the second embodiment of the scanner according to the invention in partial cross-section.

In the embodiment shown in FIG. 6; the arm 11 is not directly rotated by the drive means 7 but indirectly via a belt 18 and the wheel 13. The drive means 7 rotates a wheel 19, which is fixedly mounted on the hollow shaft 8. The rotational movement of the wheel 19 is transferred by means of the belt 18 to a wheel 20 which is fixedly connected with the axis 12. The rotation of the wheel 20, and thus of the axis 12, the polygon 10 and the wheel 13, causes the wheel 13 to roll along the race 14. This in turn causes the arm 11 to rotate around the shaft 8, on which it is rotatably mounted by means of a bearing 21. Apart from the drive mechanism, the embodiment of FIG. 6 is substantially identical to that of FIG. 5.

Figure 7A:
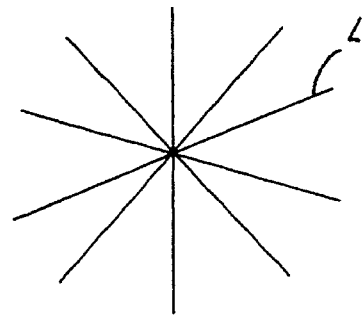
FIG. 7a and 7b show scanning patterns produced by means of an optical scanner according to any of the preceding figures.

The scanning pattern shown in FIG. 7a is typical of the first embodiment of the inventive scanner as illustrated in FIGS. 1 and 2. The star-shaped pattern shown consists of a number of scanning lines L converging on and intersecting in a common point. The actual number of scanning lines L depends on the number of mirrors of the array 4. Preferably, the number of mirrors is odd.

Figure 7B:
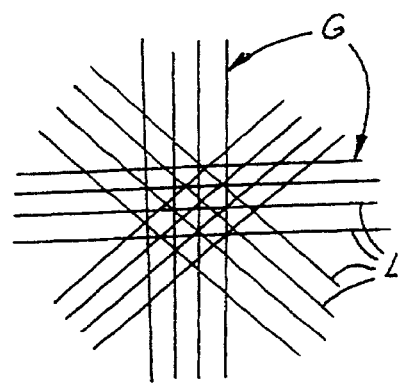

The scanning pattern shown in FIG. 7b may be produced by the second embodiment shown in FIGS. 3, 4, 5, 6 and 8. The scanning lines L converge on a common area but do not all intersect in the same point. The pattern of FIG. 7b consists of a number of groups G of scanning lines L. Each group G, corresponding to a certain orientation, is made up of a number, e.g. four, substantially parallel scanning lines L depending on the tilting angles of he facets of the polygon. The total number of lines L is determined by the total number of faces 10a–10i of the polygon 10 and of the rotational speed of the arm 11.

The scanning patterns illustrated in FIGS. 7a and 7b provide an excellent scanning capability and are, due to the specific structure of the inventive scanner, substantially independent of the distance of the scanning plane from the optical scanner.

In order to decrease costs of scanner and rotational driving, a conventional motor having a solid shaft instead of a hollow shaft can be used. In this case, for a drive means 7 (or drive means 7a) having a solid shaft, the incident point of the beam on the second deflector 2 has to be shifted off-axis to allow this beam to be reflected back to the direction, in which it was incident on the first deflector 1. Most scanning patterns produced with such an arrangement will not intersect the rotational axis. Such a pattern may, however, still be acceptable if the shift is relatively small.

As mentioned before, during the rotation of the deflector 1 together with the deflector 2, the scanning line will be curved since the incident point of the beam on the second deflector is rotating around the first axis and moving in the radial direction. It is assumed that the light deflected from the first deflector produces a planar scanning surface, which is reflected by the mirror in the array to form a straight scanning line on it. In order to generate a space-invariant pattern, the second deflector and the mirror in the array have to be specially arranged. Since the two deflectors are spaced along the first axis, the beam, incident on the second deflector, is not normal to the first axis. Incident on the tilted second deflector, this beam will form a scanning locus on this deflector, containing an additional rotation component around the said first axis, which can increase or decrease the curvature of the scanning line in the reading plane, depending on their tilting directions.

As shown in FIGS. 1 and 2, if two deflectors rotate together, the distance between the incident points on the two deflector will increase with increasing rotation angle. The incident point on the second deflector is then moving from the first deflector along the rotation axis. Due to tilting of the second deflector, this point is moving further from the rotation axis. In other words, the additional rotation has the same direction as that for the deflector. The scanning line, produced by the, scanner in FIG. 1, is then more curved.

In present new embodiment, the second deflector is mounted on the rotation shaft such that it is closer to the motor than the first one, which deflects the incident beam normally to the mirror in said array. Since the second deflector is now tilted such that the additional rotation on the second deflector has the direction, opposite to the rotation direction of the deflector, the curvature of the scanning line will then decrease.

FIG. 8a shows a further embodiment according to the invention in which no motor 7 with a hollow shaft 8 is needed. Avoiding the use of a motor with a hollow shaft leads to a substantial reduction of costs.

In FIG. 8a the same reference numbers refer to the same parts or components as in the preceding figures.

In the arrangement according to FIG. 8a the laser beam B originating from laser source 5 after passing suitable optics 6 impinges upon reflector 30 which is fixed relative to a transparent window 32 of the optical scanner. Reflector 30 reflects laser beam B towards the first rotatable deflector 1 which is mounted on a shaft 35 of a motor 7c. Also mounted on the shaft 35 is second rotatable deflector 2.

The laser beam B is reflected by reflector 30 substantially along the axis of rotation of shaft 35 and is reflected by the first deflector 1 to a rotatable internal polygon 31. By an "internal polygon" a polygonal mirror array 31 having reflective faces 31a, 31b, 31c, 31d, 31e, . . . is meant. Internal polygon 31 is drivingly connected to a further motor 7d via gears 39 or other means.

Laser beam B is reflected by the reflective faces 31a, 31b, 31c, 31d, 31e, . . . to object C to be scanned, e.g. a bar code, via second deflector 2. As can be seen from FIG. 8a, laser beam B after being reflected by deflector 2 propagates parallel to but does not coincide with the axis of rotation of deflectors 1 and 2, since if it would coincide laser beam B would impinge on reflector 30 again. Instead, laser beam B passes past reflector 30 and leaves the scanner through the transparent window 32.

As will be clear from FIG. 8a laser beam B when leaving window 32 "circles" around the axis of rotation of deflectors 1 and 2. The scanning pattern generated on object C, therefore, comprises curved scanning lines. The exact curvature depends on the locations of deflectors 1, 2, on the ratio of the speed of rotation of deflectors 1 and 2 and the speed of rotation of internal polygon 31. Preferably, the distance between motor 7c and the first deflector 1 is much larger than between said motor 7c and the second deflector 2 since then the angle between incoming laser beam B on deflector 2 and reflected laser beam B from deflector 2 will be small, resulting in less curved scanning lines. When the motor 7d is at a standstill (or is omitted in a further alternative embodiment, as explained below) a multiple-directional scanning pattern will be produced.

Figure 8B:
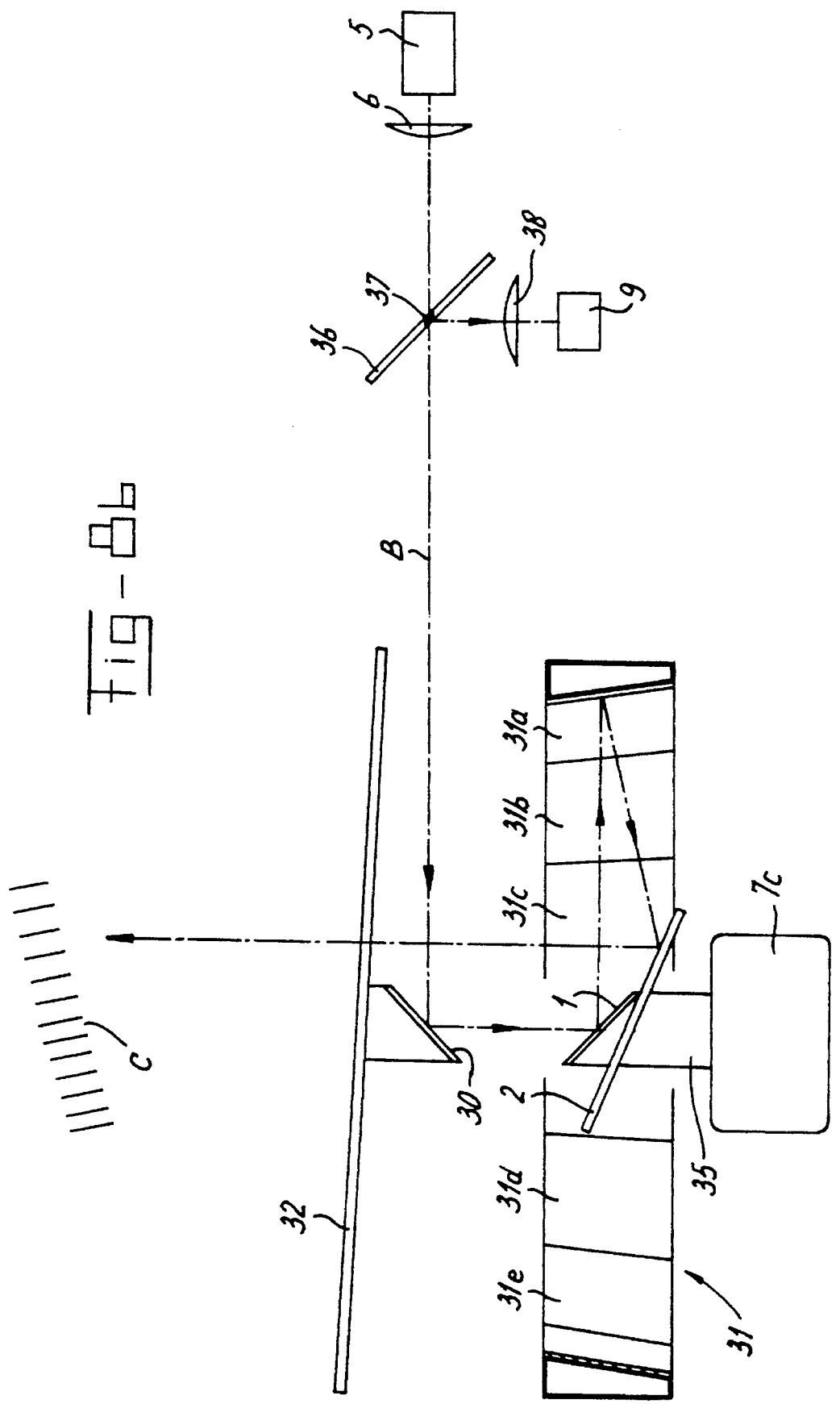
Figure 9:
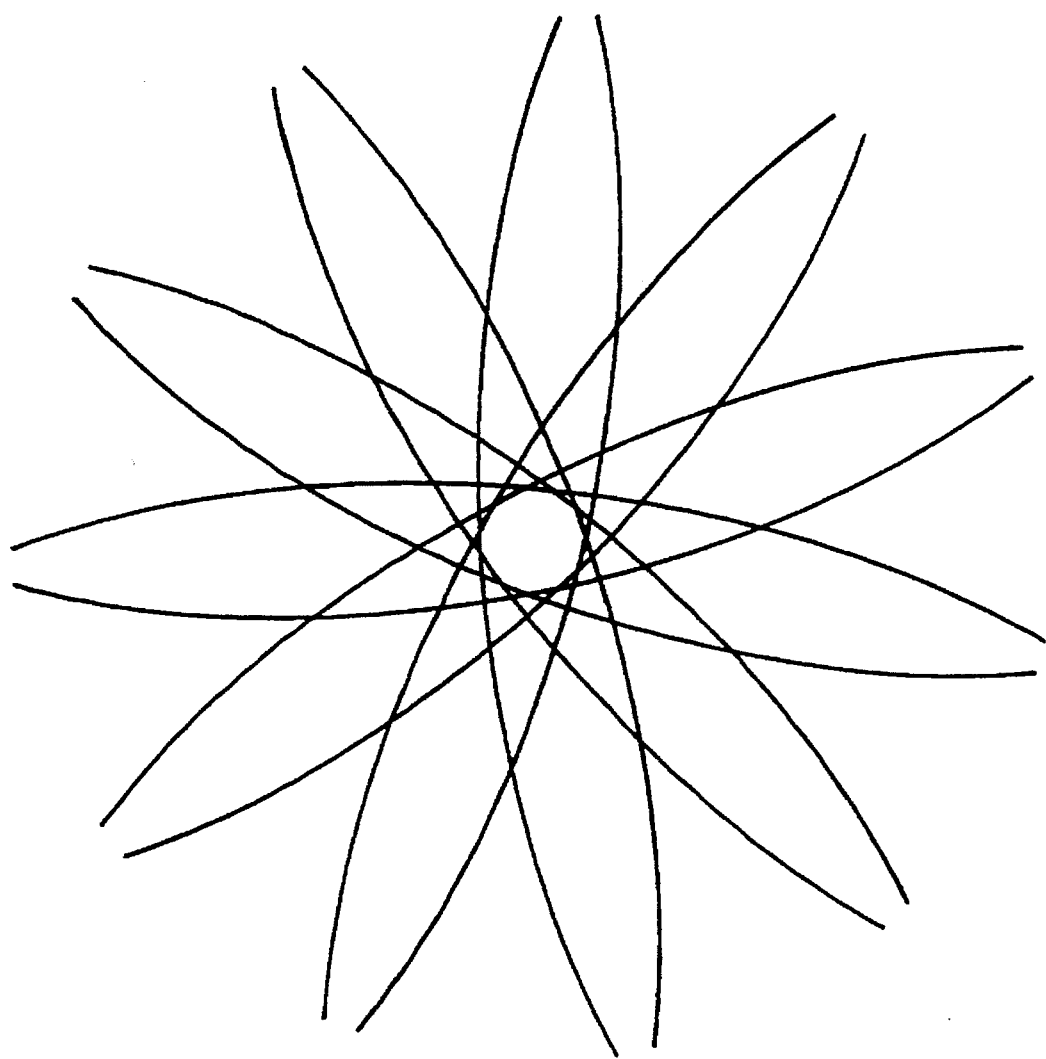

FIG. 9 shows an example of a scanning pattern which may be generated by an arrangement according to FIG. 8a in which internal polygon 31 comprises 11 reflective faces 31a, 31b, . . . .

Sets of parallel scanning lines may be obtained when the motor 7c does not rotate. Pairs of scanning lines (slightly curved) may also be produced if the even mirrors are used in the internal polygon 31. Two mirrors, facing each other, in this polygon may have mutually different tilting angles.

Motors 7c and 7d may be substituted by one single motor by which deflectors and 2 are rotated by a first transmission ratio and internal polygon 31 by a second transmission ratio.

In a further alternative embodiment as shown in FIG. 8b, motor 7d may be omitted and polygon 31 will be fixed to the scanner housing (not shown). Thus, less sets of scanning lines are possible, but such an arrangement will be cheaper and easier to be manufactured.

In order to increase the light collection efficiency a further reflector 36 having a hole 37 is provided between laser source 5 and reflector 30. Laser beam B originating from laser source 5 and having passed optics 6 passes the hole 37. Light scattered back from object C propagates back through transparent window 32, and is reflected by deflector 2, internal polygon 31, deflector 1, an reflector 30 to reflector 36. From reflector 36 the back scattered light will be reflected to and collected by a lens 38. Photodetector 9 detects the light collected by lens 38. In order to avoid disadvantageous reflections from transparent window 32, directly to the photodetector, said window 32 may be tilted somewhat relative to the axis of rotation of deflectors 1 and 2, as shown in FIG. 8a.

FIG. 10 shows an other embodiment of the present invention in which a conventional motor with a solid shaft is used. In FIG. 10 the same reference numbers used in previous figures refer to the same parts or components. These parts or components will not be explained again.

In the embodiment according to FIG. 10 a conventional motor 7c comprises a solid shaft 41 which supports the first deflector 1. First deflector 1 is rotatable about a first axis of rotation. An external polygon 40 having facets 40a, 40b, 40c, . . . is fixed on a shaft 42 which is supported by bearings 48 within the shaft 41 of motor 7c. The shaft 42 together with the polygon 40 are rotatable about a second axis of rotation extending in the longitudinal direction of shaft 42. The first and second axis of rotation are perpendicular to each other. On the side opposite to polygon 40 the shaft 42 supports a wheel 43. The wheel 43 is supported by a race 44. When the shaft 41 is driven by motor 7c the shaft 42 will rotate around the first axis of rotation thereby forcing wheel 43 to rotate on race 44; thereby the shaft 42 is also forced to rotate around the second axis of rotation, i.e. about its own longitudinal direction.

The first deflector 1 and the facets 40a, 40b, 40c, . . . of the external polygon 40 are most preferred to be tilted in such a way that the laser beam after reflection by the polygon 40 is parallel to the laser beam incident upon the first deflector 1, however, in opposite direction. Due to the rotation of the polygon 40 the laser beam deflected by the polygon 40 scans a line, normal to the second axis of rotation, on an object, for instance a bar code C. Because of the combined rotation about the first and second axis of rotation a multiple-directional pattern is formed in which the scanning lines are curved.

A scanning pattern-and the curvature of the scanning lines depend on the diameter of the wheel 43 and race 44 as well as on the number of facets of the polygon 40.

Light reflected back by the object C is collected by mirror 36 and a focussing lens, 38. Instead of the mirror 36 and focussing lens 38 a curved mirror can be used. This also applied to the embodiment shown in FIG. 8a.

It will be understood that various modifications can be made in the embodiments described herein without departing from the scope of the present invention.

I claim:

1. An optical scanner comprising a laser source for generating a laser beam, a first deflector having a front deflecting side and a rear side rotatable about an axis of rotation by a first driving means connected to said rear side of said first deflector and arranged for receiving said laser beam, an array of reflectors made of a polygon having internal reflective faces arranged about said axis of rotation, said polygon being arranged for receiving said laser beam deflected by said first deflector, a second deflector rotatable about said axis of rotation and arranged for receiving said laser beam deflected by said polygon and to deflect said laser beam in a direction substantially parallel with said axis of rotation to an object to be scanned, said optical scanner further comprising at least one detector for detecting light scattered back from said object and a third stationary deflector for directing said laser beam originating from said laser source towards said front deflecting side of said first deflector substantially along said axis of rotation.

2. An optical scanner according to claim 1 wherein said polygon is rotatable about said axis of rotation by a second driving means.

3. An optical scanner according to claim 2 wherein said second driving means comprise a second motor.

4. An optical scanner according to claim 1 wherein said reflective faces have mutually different tilting angles with respect to said axis of rotation.

5. An optical scanner according to claim 1 wherein said first deflector and second deflector are together drivingly connected to said first driving means comprising a first motor.

6. An optical scanner according to claim 5 wherein the distance between said first deflector and said first motor is much larger than between said second deflector and said first motor.

7. An optical scanner according to claim 1 wherein said scanner comprises a fourth deflector comprising a hole, said fourth deflector being arranged between said laser source and said third deflector for passing said laser beam originating from said laser source through said hole and for reflecting light scattered back by said object towards said at least one detector.

* * * * *